United States Patent
Rizzolatti et al.

(10) Patent No.: US 10,804,798 B1
(45) Date of Patent: Oct. 13, 2020

(54) SWITCHED-CAPACITOR CONVERTER WITH MULTI-TAPPED AUTOTRANSFORMER

(71) Applicant: Infineon Technologies Austria AG, Villach (AT)

(72) Inventors: Roberto Rizzolatti, Villach (AT); Christian Rainer, Klagenfurt (AT); Otto Wiedenbauer, Villach (AT)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 16/397,275

(22) Filed: Apr. 29, 2019

(51) Int. Cl.
  *H02M 3/07* (2006.01)
  *H01F 29/02* (2006.01)
  *H02M 1/00* (2006.01)

(52) U.S. Cl.
  CPC ............ *H02M 3/07* (2013.01); *H01F 29/025* (2013.01); *H02M 2001/0003* (2013.01); *H02M 2001/0058* (2013.01)

(58) Field of Classification Search
  CPC .... H02M 3/33569; H02M 3/07; H02M 3/073; H02M 7/10; H02M 7/5387; H02M 7/53871; H02M 5/10; G05F 1/253
  USPC .... 323/247, 255, 256, 258, 262; 363/17, 59, 363/60, 127, 132
  See application file for complete search history.

(56) References Cited

U.S. PATENT DOCUMENTS

| | | | | |
|---|---|---|---|---|
| 6,657,873 B2* | 12/2003 | Igarashi | ................ | H02M 3/337 363/17 |
| 7,515,439 B2* | 4/2009 | Leu | .................... | H02M 3/33569 363/127 |
| 2010/0226154 A1* | 9/2010 | Leu | ......................... | H02M 1/34 363/106 |
| 2014/0146572 A1* | 5/2014 | Ye | ......................... | H02M 3/337 363/17 |

FOREIGN PATENT DOCUMENTS

DE   102010023814 A1   2/2011

OTHER PUBLICATIONS

Extended European Search Report, EP 20 17 1446.6, dated Aug. 6, 2020, pp. 1-9.

(Continued)

*Primary Examiner* — Nguyen Tran
(74) *Attorney, Agent, or Firm* — Armis IP Law, LLC

(57) ABSTRACT

A power supply system comprises: a switched-capacitor converter, a multi-tapped autotransformer, and an output stage. The multi-tapped autotransformer includes multiple primary windings. The switched-capacitor converter includes multiple circuit paths coupled to the primary windings. For example, a first circuit path includes a first capacitor; a second circuit path includes a second capacitor. The power supply further includes a controller that controllably switches an input voltage to the first circuit path and the second circuit path, conveying energy to the primary windings of the multi-tapped autotransformer. The output stage of the power supply is coupled to receive energy from a combination of the first primary winding and the second (Continued)

primary winding of the multi-tapped autotransformer. Via the received energy, the output stage produces an output voltage that powers a load.

26 Claims, 13 Drawing Sheets

(56) References Cited

OTHER PUBLICATIONS

Jang Y et al., "Multi-Phase Buck Converters with Extended Duty Cycle", Applied Power Electronics Conference and Exposition, 2006, APEC 06, Twenty-First Annual IEEE, Mar. 19, 2006, Piscataway, NJ, USA, pp. 38-44, XP010909919.
Ke Jin et al., "Self-driven schemes for 12V self-driven voltage regulator", Energy Conversion Congress and Exposition, 2009, ECCE. IEEE, IEEE, Piscataway, NJ, USA, Sep. 20, 2009, pp. 1648-1654, XP031887687.
Saggini Stefano, et al., "A 99% Efficient Dual-Phase Resonant Switched-Capacitor-Buck Converter for 48 V Data Center Bus Conversions", 2019 IEEE Applied Power Electronics Conference and Exposition (APEC), IEEE, Mar. 17, 2019, pp. 482-486, XP033555977.

\* cited by examiner

SWITCHED-CAPACITOR CONVERTER WITH MULTI-TAPPED AUTOTRANSFORMER

BACKGROUND

As its name suggests, a conventional switched-capacitor DC-DC converter converts a received DC input voltage into a DC output voltage.

In one conventional application, the input voltage to the conventional switched-capacitor converter falls in a range between 40 VDC to 60 VDC. In such an instance, switches in the switched-capacitor converter are controlled to transfer charge stored in respective capacitors, resulting in conversion of the input voltage such as a 48 VDC to an output voltage such as 12 VDC for a so-called conventional 4:1 switched-capacitor converter. In other words, a conventional switched-capacitor converter can be configured to convert a 48 VDC voltage into a 12 VDC voltage.

To avoid so-called hard switching in the switched-capacitor converter, the switches in the switched-capacitor converter are preferably switched when there is near zero voltage across them and near zero current flowing through them.

The undesirable hard switching in a conventional switched-capacitor converter may be mitigated by placing an individual inductor in series with a respective capacitor in each stage of the switched-capacitor converter. This results in a resonant (or semi-resonant) switching converter. Such a switched-capacitor converter is sometimes termed a switched tank converter (STC). The resonant tank circuit formed by a series connection of an inductor and capacitor has an associated resonant frequency that is based upon the inductance and capacitance of these components.

Switching of the switches in the conventional switched-capacitor converter at the respective resonant frequency results in so-called zero current switching (ZCS), which reduces switching losses and provides good power conversion efficiency.

BRIEF DESCRIPTION

This disclosure includes the observation that power conversion efficiency of conventional switched-capacitor converters can be improved. For example, to this end, embodiments herein include novel ways of providing improved performance of a switched-capacitor converter and efficient generation of a corresponding output voltage.

More specifically, according to one embodiment, an apparatus (such as a power supply) comprises: a switched-capacitor converter, a multi-tapped autotransformer, and an output stage. The multi-tapped autotransformer includes multiple primary windings and at least a secondary winding (such as multiple secondary windings). The switched-capacitor converter includes multiple circuit paths coupled to the primary windings. For example, a first circuit path of the switched-capacitor converter includes a first capacitor; a second circuit path of the switched-capacitor converter includes a second capacitor. The power supply further includes a controller that controllably switches an input voltage to the first circuit path and the second circuit path (such as in a primary stage), conveying energy to the primary windings of the multi-tapped autotransformer. The output stage (such as a secondary stage) of the power supply is coupled to receive energy conveyed from a combination of the first primary winding and the second primary winding of the multi-tapped autotransformer. Via the received energy, the output stage produces an output voltage that powers a load.

Note that any of one or more of the components of the power supply such as the switched-capacitor converter, transformer, multi-tapped autotransformer, voltage converter, controller, etc., can be implemented as hardware (such as circuitry), software (and corresponding executed instructions), or a combination of both hardware and software.

In accordance with further embodiments, the power supply as described herein includes a unique multi-tapped autotransformer in which the first primary winding and the second primary winding are connected in series with respect to the secondary winding. More specifically, the first primary winding is connected in series with the secondary winding; the second primary winding is connected in series with secondary winding.

Note further that the multi-tapped autotransformer as described herein can be configured such that the secondary winding which is inductively coupled to the first primary winding and the second primary winding. In one embodiment, the first primary winding, the second primary winding, and the secondary winding(s) are magnetically coupled to each other. If desired, the secondary winding(s) is center tapped to facilitate producing the output voltage from an output of the center-tapped winding.

In accordance with further embodiments, the power supply as described herein includes an inductor connected across nodes of the multi-tapped autotransformer. In one embodiment, the inductor is connected in parallel with one or more secondary windings of the multi-tapped autotransformer. The inductor provides zero voltage switching (ZVS) of switches in the switched-capacitor converter. Additionally, or alternatively, note that the zero voltage switching capability as described herein can be provided by the magnetizing inductance associated with the multi-tapped autotransformer.

In accordance with further embodiments, the switched-capacitor converter includes multiple switches operable to convey energy from a voltage source (such as an input voltage) to each of the first primary winding and the second primary winding during different portions of a control cycles of controlling the multiple switches. In one embodiment, the switched-capacitor converter includes multiple resonant circuit paths operable to convey energy from an input voltage source to the first primary winding and the second primary winding. A first switch (or switches) of the switched-capacitor converter selectively couples the first resonant circuit path to the input voltage; a second switch (or switches) of the switched-capacitor converter couples the second resonant circuit path to the input voltage.

In accordance with further embodiments, the switched-capacitor converter includes multiple capacitors such as a first capacitor and a second capacitor; the first resonant circuit path includes a combination of the first capacitor and the first primary winding; the second resonant circuit path includes a combination of the second capacitor and the second primary winding. The controller switches between: i) coupling the first resonant circuit path (combination of first capacitor and first primary winding) to an input voltage, and ii) coupling the second resonant circuit path (combination of second capacitor and second primary winding) to the input voltage. In such an instance, the secondary winding of the multi-tapped autotransformer receive energy from multiple different resonant circuit paths during different portions of a control cycle.

In accordance with still further embodiments, the first capacitor in the first resonant circuit path is a first flying capacitor of the switched-capacitor converter; the second capacitor in the second resonant circuit path is a second flying capacitor of the switched-capacitor converter.

Embodiments herein are useful over conventional techniques. For example, in contrast to conventional techniques, the novel power supply includes a switched-capacitor converter, multi-tapped autotransformer, and voltage converter that collectively provide higher efficiency of converting an input voltage to a respective output voltage. Such an embodiment provides lower loss of energy during generation of a respective output voltage.

These and other more specific embodiments are disclosed in more detail below.

Note that any of the resources as discussed herein can include one or more computerized devices, apparatus, hardware, etc., that execute and/or support any or all of the method operations disclosed herein. In other words, one or more computerized devices or processors can be programmed and/or configured to operate as explained herein to carry out the different embodiments as described herein.

Yet other embodiments herein include software programs to perform the steps and/or operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate generation of an output voltage to power a load. The instructions, when executed by computer processor hardware, cause the computer processor hardware (such as one or more co-located or disparately located processor devices or hardware) to: receive energy from an input voltage source; controllably switch multiple capacitor circuit paths to convey the energy from the input voltage source to a first primary winding and a second primary winding of a multi-tapped autotransformer, the multi-tapped autotransformer operable to convey the energy to an output stage; and at the output stage, via the energy received from the multi-tapped autotransformer, produce an output voltage to power a load.

The ordering of the steps above has been added for clarity sake. Note that any of the processing steps as discussed herein can be performed in any suitable order.

Other embodiments of the present disclosure include software programs and/or respective hardware to perform any of the method embodiments steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

Note further that although embodiments as discussed herein are applicable to controlling operation of a switched-capacitor converter, the concepts disclosed herein may be advantageously applied to any other suitable voltage converter topologies.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
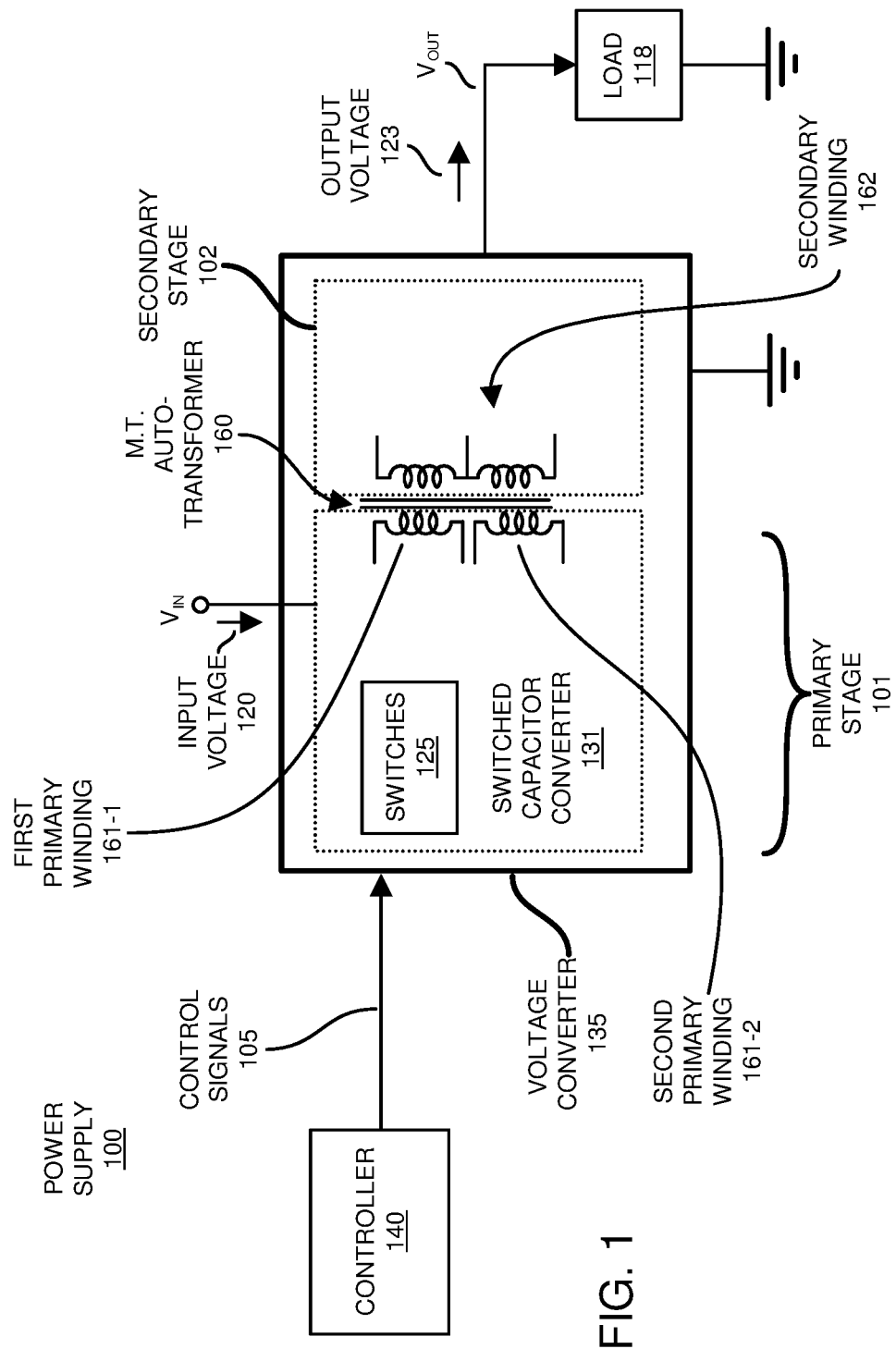
FIG. 1 is an example diagram illustrating a power supply including a switched-capacitor converter and multi-tapped autotransformer according to embodiments herein.

The foregoing and other objects, features, and advantages of embodiments herein will be apparent from the following more particular description herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to one embodiment, as further discussed herein, an apparatus such as a power supply system comprises: a switched-capacitor converter, a novel multi-tapped autotransformer, and an output stage. The multi-tapped autotransformer includes multiple primary windings and at least a secondary winding (such as multiple secondary windings). The switched-capacitor converter includes multiple circuit paths coupled to the primary windings. For example, a first circuit path of the switched-capacitor converter includes a first capacitor; a second circuit path of the switched-capacitor converter includes a second capacitor. The power supply further includes a controller that controllably switches an input voltage to the first circuit path and the second circuit path, conveying energy to the primary windings of the multi-tapped autotransformer. The output stage of the power supply (such as including a second winding of an multi-tapped autotransformer) is coupled to receive energy conveyed from a combination of the first primary winding and the second primary winding of the multi-tapped autotransformer. Via the received energy at the secondary winding, the output stage produces an output voltage that powers a load.

Now, more specifically, FIG. 1 is an example diagram illustrating a power supply including a switched-capacitor converter and multi-tapped autotransformer according to embodiments herein.

As shown in this example embodiment, power supply 100 (such as an apparatus, electronic device, etc.) includes a controller 140 and voltage converter 135. The voltage converter 135 includes a primary stage 101 and a secondary stage 102.

Primary stage 101 includes a switched-capacitor converter 131 comprising switches 125, first primary winding 161-1, and second primary winding 161-2 of multi-tapped autotransformer 160. Note that the multi-tapped autotransformer 160 is shown by way of a non-limiting example embodiment and can be instantiated as any suitable device such as a transformer, transformer device, transformer apparatus, etc. Secondary stage includes secondary winding 162 of multi-tapped autotransformer 160 and related circuitry to generate output voltage 123 (Vout, such as a generally a DC voltage). Secondary winding 162 comprises first secondary winding 162-1 and second secondary winding 162-2.

Note that each of the resources as described herein can be instantiated in a suitable manner. For example, each of the controller 140, switched-capacitor converter 131, multi-tapped autotransformer 160, etc., can be instantiated as or include hardware (such as circuitry), software (executable instructions), or a combination of hardware and software resources.

During operation, controller 140 produces control signals 105 (such as one or more pulse width modulation signals) that control states of respective control switches 125 in switched-capacitor converter 150.

As further shown, the switched-capacitor converter 150 receives the input voltage 120 (Vin, such as a DC input voltage) supplied to the switched-capacitor converter 131. As previously discussed, the multi-tapped autotransformer 160 includes a first primary winding 161-1 and a second primary winding 162-1. In one embodiment, the primary windings 161 are at least inductively coupled to the secondary winding 162. In accordance with further embodiments, the primary windings 161 are connected in series with the secondary windings 162.

As further discussed herein, controller 140 of the power supply 100 controllably switches multiple capacitors and corresponding resonant circuit paths including the primary windings 161 of multi-tapped autotransformer 160 to convey energy from the input voltage (Vin) through the primary winding 161 to the secondary winding 162 to produce the output voltage 123.

Figure 2:
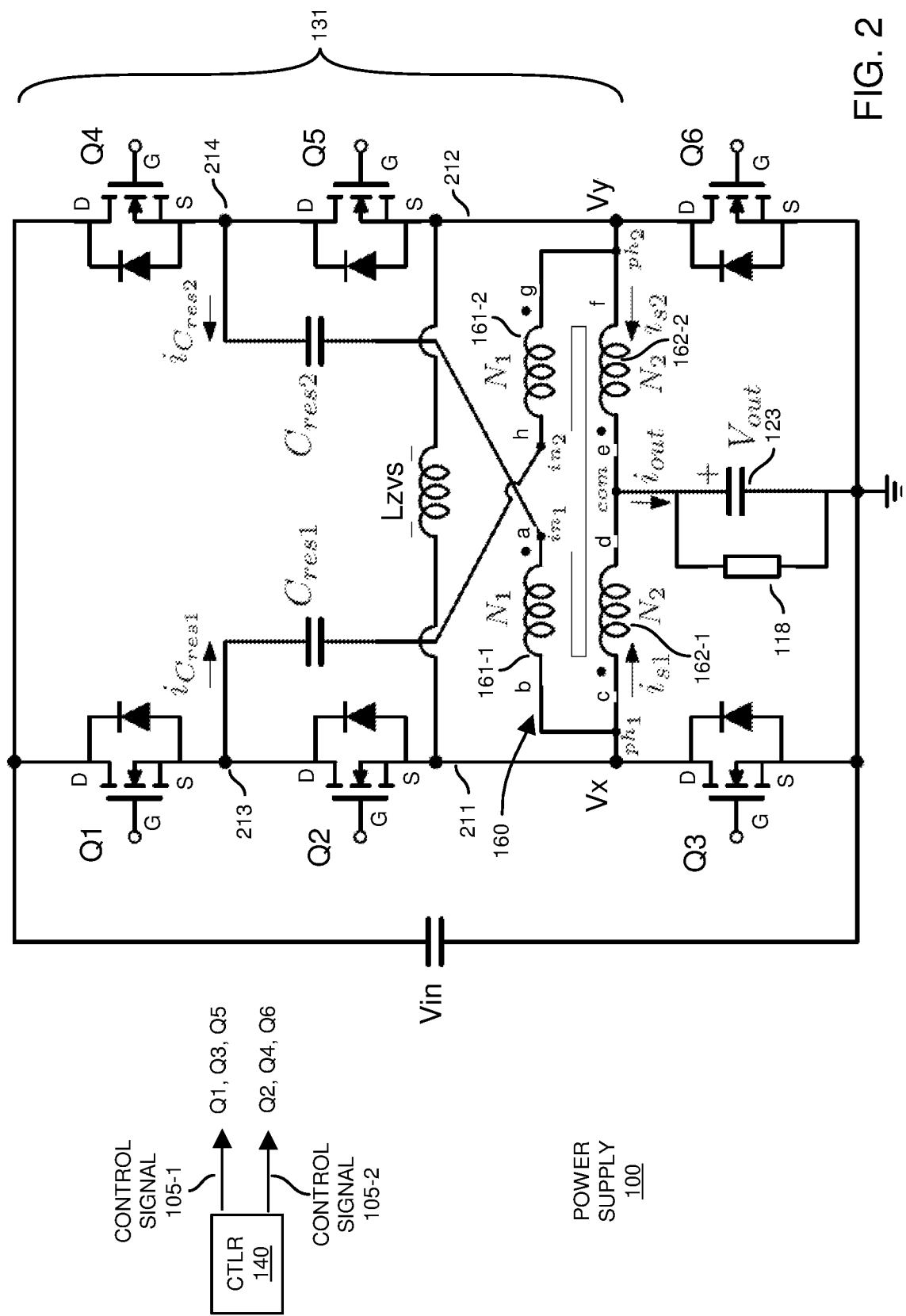
FIG. 2 is an example diagram illustrating a controller and a more detailed rendition of a power supply including a switched-capacitor converter and a multi-tapped autotransformer according to embodiments herein.

FIG. 2 is an example diagram illustrating a switched-capacitor converter according to embodiments herein.

As shown, the power supply 100 includes voltage source Vin, switched-capacitor converter 131, and multi-tapped autotransformer 160.

The switched-capacitor converter 131 (apparatus such as hardware, circuitry, etc.) includes multiple switches Q1, Q2, Q3, Q4, Q5, and Q6 (such as field effect transistors or any other suitable type of switch). Additionally, the switched-capacitor converter 150 includes multiple circuit components including inductor Lzvs, capacitor Cres1, and capacitor Cres2.

Further in this example embodiment, the multi-tapped autotransformer 160 includes primary winding 161-1 (such as N1 turns), primary winding 161-2 (such as N1 turns), secondary winding 162-1 (such as N2 turns), and secondary winding 162-2 (such as N2 turns). The number of windings (N1, N2, etc.) associated with the primary winding 161 and/or the secondary winding 162 can be any suitable value and vary depending on the embodiment.

In one embodiment, a combination of the primary windings and secondary windings of multi-tapped autotransformer 160 are connected in series. For example, primary winding 161-1 is connected in series with secondary winding 162-1; secondary winding 162-1 is connected in series with secondary winding 162-2; secondary winding 162-2 is connected in series with primary winding 161-2.

In accordance with further embodiments, the secondary winding 162 (such as a tapped secondary winding, or multiple secondary windings connected in series) is inductively coupled to the first primary winding 161-1 and second primary winding 161-2. In other words, as shown, the first primary winding 161-1, the second primary winding 161-2, and the secondary winding(s) 162 are magnetically coupled to each other. If desired, the secondary winding 162 can be a center tapped winding facilitating generation of the output voltage 123 from a respective output of the center-tapped winding.

Further in this example embodiment, the drain node (D) of switch Q1 and the drain node (D) of switch Q4 are connected to the input voltage source Vin.

Further, the source node (S) of the switch Q1 is coupled to the drain node (D) of the switch Q2 (node 213). The source node (S) of the switch Q4 is coupled to the drain node (D) of the switch Q5 (node 214). The source node (S) of the switch Q2 is coupled to node 211. The source node (S) of the switch Q5 is coupled to node 212.

Capacitor Cres1 is connected between node 213 and a respective node of primary winding 161-2. Capacitor Cres2 is connected between node 214 and a respective node of primary winding 161-1.

Inductor Lzvs is coupled in parallel to primary winding 161 and is disposed between node 211 and 212.

The drain (D) of switch Q3 is connected to node 211; the source (S) of switch Q3 is connected to ground. The drain (D) of switch Q6 is connected to node 212; the source (S) of switch Q6 is connected to ground.

The center tap (com node) of the secondary winding 162 outputs current Tout and corresponding output voltage 123 to drive load 118 (a.k.a., Ro).

In one embodiment, the magnitude of the output voltage 123 is Vin/8. Thus, if Vin=48 VDC, the magnitude of the output voltage 123 is 6 volts. However, as discussed herein, settings of components in the power supply 100 can be adjusted to produce an output voltage 123 (Vout) of any suitable value. In general the output voltage 123, Vout=Vin*(N2/(2*(2N2+N1))), where N1=the number of turns on the primary windings 161 and N2 is the number of turns on each of the secondary windings 162.

In one embodiment, N1 is defined as the turns of each primary windings whilst N2 is defined as the turns of each secondary windings; in which case Vout=Vin*N2/(2*(2*N2+N1)).

As further shown, during operation, the controller 110 produces control signals 105-1 and 105-2.

Further in this example embodiment, control signal 105-1 generated by the controller 140 drives gates (G) of respective switches Q1, Q3, and Q5. Accordingly, control signal 105-1 controls a state of each of the switches Q1, Q3, and Q5.

Control signal 105-1 drives respective gates (G) of switches Q1, Q3, and Q5. Accordingly, control signal 105-2 controls a state of each of the switches Q2, Q4, and Q6.

Note that each of the switches as described herein can be any suitable devices such as (Metal Oxide Semiconductor) field effect transistors, bipolar junction transistors, etc.

The settings of capacitors Cres1 and Cres2 can be any suitable value. In one embodiment, the voltage converter 135 as described herein provides better performance when Cres1=Cres2, and works well even if Cres1≠Cres2.

The inductor Lzvs can be any suitable value. See the discussion below in text associated with FIG. 4 indicating an example setting of inductor Lzvs to provide zero voltage switching to switches in the power supply 100.

Referring again to FIG. 2, in one embodiment, additional inductance (such as inductor Lzvs) in parallel with the multi-tapped autotransformer 160 is optionally present to achieve zero voltage switching (ZVS) for one or more switches Q1-Q6. As further discussed below, the Lzvs inductance alternatively can be integrated in the multi-tapped autotransformer 161 (such as with gaps in the respective core or using core with lower permeability).

As previously discussed, switches in power supply 100 are divided into two switch groups: the first switch group including switches Q1, Q3, and Q5 controlled by respective control signal 105-1, and a second switch group including switches Q2, Q4, and Q6, controlled by respective control signal 105-2, which is generally a 180 degrees phase shift with respect to timing of control signal 105-1.

In one embodiment, the pulse width modulation of control signals 105 is approximately 50% to obtain the minimum RMS current.

The magnitude of the output voltage 123 depends on the turns (# of windings ratio N1/N2 of the primary winding to the secondary winding). In one embodiment, the switching frequency does not change directly the magnitude of the output voltage, but in general is changing it because the losses are increasing or decreasing based on the difference between Fres and Fsw, where Fres is the resonant frequency of the tank formed by Cres1 or Cres2 and the leakage of the multi-tapped autotransformer when Cres1=Cres2.

Embodiments herein include taking advantage of the leakage inductance, Lk, of the multi-tapped autotransformer 160 to (soft) charge the capacitors Cres1 and Cres2 during different control cycles. For example, in one embodiment, the capacitors Cres1 and Cres2 function as flying capacitors, enabling use of lower voltage field effect transistors at the primary side (switched-capacitor converter 131) in comparison to a classic LLC topology.

Note that a further benefit of the switched-capacitor converter 131 as described herein is the symmetric behavior of such a circuit. For example, as further discussed herein, via the implementation of power supply 100: i) the switched-capacitor converter 131 is powered almost continuously from the input supply Vin at different times in a respective control cycle, reducing the input current ripple as compared to other technologies, ii) in the equivalent resonant tank switched circuit paths of the switched-capacitor converter (such as first resonant circuit path including capacitor Cres1 and primary winding 161-2 and second resonant circuit path including capacitor Cres2 and primary winding 161-1), both resonant caps are resonating with the leakage inductance Lk of the multi-tapped autotransformer. In one embodiment, if Cres1 Cres2 the resonant transitions are unbalanced, which actually is not an issue for operation. In general, if the difference is the maximum difference between Cres1 and Cres2 based on the tolerance (i.e. ±10%±20%), the converter is still running with high efficiency. In such an instance the converter is still working well because of ZVS operation.

Note further that one enabler of high efficiency and high-power density of the proposed power supply 100 is the ability to implement lower voltage rating field effect transistors and the implementation of Class II ceramic capacitors (such as capacitors Cres1 and Cers2), which inherently offer high capacitance density.

Moreover, as previously discussed, the additional inductor, Lzvs, provides the inductive energy to ensure ZVS transition for all field effect transistors in the switched-capacitor converter 131 such as during all switching conditions. For example, energy stored in the inductor Lzvs supplies charge to parasitic capacitors of the respective switches during dead times such as between time T1 and T2, between time T3 and T4, and so on as further discussed below.

Figure 3:
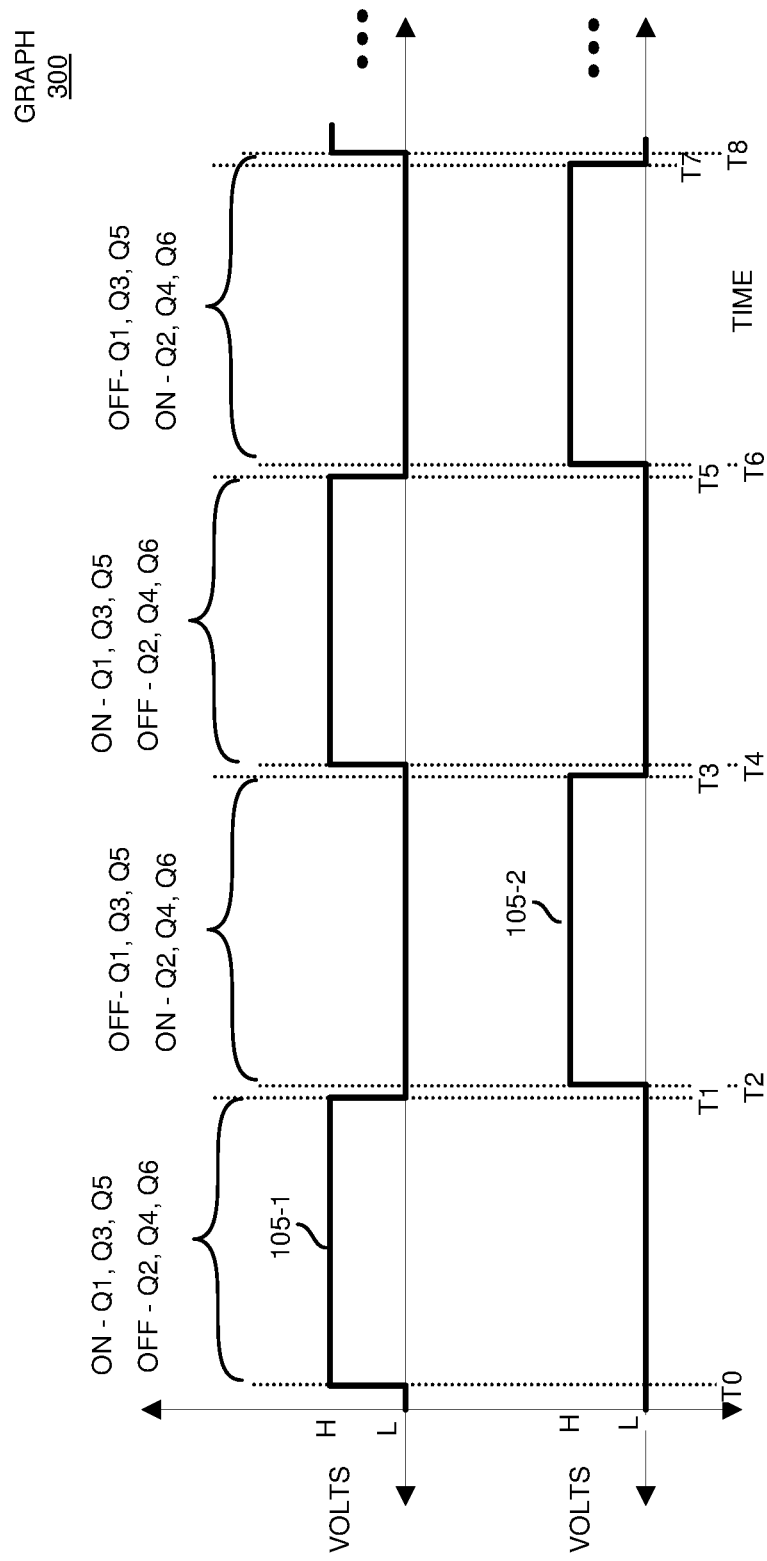
FIG. 3 is an example timing diagram illustrating timing of control signals according to embodiments herein.

FIG. 3 is an example diagram illustrating generation of controls signals that control a switched-capacitor converter and a respective voltage converter according to embodiments herein.

In general, as shown in graph 300, the controller 110 produces the control signal 105-2 to be an inversion of control signal 105-1. A pulse width of each control signal is approximately 49% or other suitable pulse width modulation value.

Between time T0 and time T1, when the control signal 105-1 (at a logic high) controls the set of switches Q1, Q3, and Q5, to an ON state (low impedance or short circuit), the control signal 105-2 (logic lo) controls the set of switches Q2, Q4, and Q6, to an OFF state (very high impedance or open circuit).

Conversely, between time T2 and time T3, when the control signal 105-2 (logic high) controls the set of switches Q2, Q4, and Q6, to an ON state, the control signal 105-1 (logic low) controls the set of switches Q1, Q3, and Q5, to an OFF state.

Note that the duration between times T1 and time T2, the duration between time T3 and time T4, duration between T5 and T6, etc., represents so-called dead times during which each of the switches (Q1-Q6) in the power supply 100 is deactivated to the OFF state.

As further shown, the control signals 105 are cyclical. For example, the settings of control signals 105 for subsequent cycles is the same as those for the cycle between time T0 and time T4. More specifically, the settings of control signals 105 produced by the controller 110 between time T3 and time T7 is the same as settings of control signals 105 between time T0 and time T3, and so on.

In one embodiment, the controller 110 controls the frequency of the control signals (period is time between T0 and time T4) can be generated at any suitable frequency.

Additionally, as previously mentioned, the controller 110 controls the pulse duration of the control signals 105 to be around 49% depending on the dead-time duration, although the control signals 105 can be generated at any suitable pulse width modulation value.

A magnitude of the output voltage 123 depends on the multi-tapped autotransformer 160 turns ratio (N1/N2). The ratio between the input voltage Vin and output voltage Vout is given by the following equation:

$$Vin/Vout = 4 + [(2*N1)/N2]$$

Thus, the power converter as described herein is scalable to different conversion ratios by designing only the ratio between N1 and N2, which actually leads to claim a new family of unregulated hybrid dc-dc converter with different possible ratios Vin/Vout (such as 5 to 1, 6 to 1, 7 to 1, 8 to 1, . . . ).

Note that further embodiments herein take advantage from the leakage inductance of the multi-tapped autotransformer 160 to soft charge the capacitors Cres1 and Cres2, which act as flying capacitors, enabling use of lower voltage related MOSFETs in the primary side (primary stage 101) in comparison with conventional (classic) LLC converter topologies. Switches Q1 and Q4 block a portion of the input voltage which can be defined by the following equation:

$$Vmax(Q1,Q4) = Vin/2 + Vout*N1/N2$$

During operation, switch Q2 and switch Q5 have to block the entire input voltage Vin, while switch Q3 and Q6 have to block 2*Vout.

As previously discussed, another benefit of the power supply as described herein is its symmetric behavior, which provides a benefit that the dynamic load 118 is powered any time from the input supply Vin during each phase, reducing the current/voltage ripple on the output voltage 123.

Note further that the magnitude of the output voltage 123 (Vout) depends on the turns (# of windings N1 and N2 associated with the primary windings 161 and the secondary windings 162; N1 is the turns of each primary winding and N2 is the turns of each secondary windings. In such an instance, there exists a following relation between input and output: Vin/Vout=4+[(2*N1)/N2]) and the switching frequency of the control signals 105. These can be selected to be any suitable settings. Accordingly, attributes of the switched-capacitor converter 120 can be modified to convert any input voltage level to a respective desired (such as unregulated) output voltage level.

Figure 4:
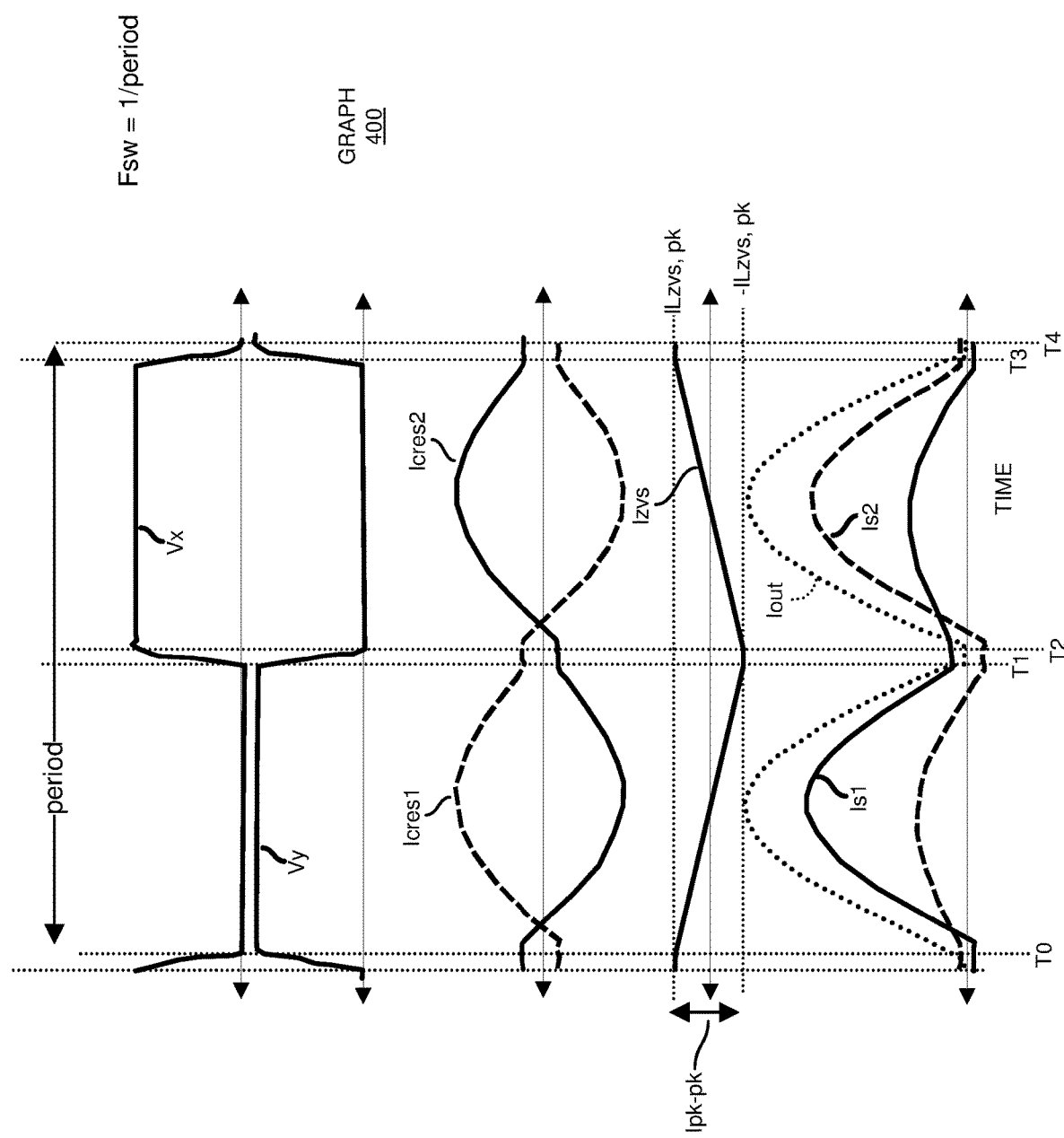
FIG. 4 is an example diagram illustrating a timing diagram of control signals and output signals according to embodiments herein.

FIG. 4 is an example diagram illustrating a timing diagram of output signals according to embodiments herein.

In this example embodiment, as previously discussed, the voltage Vx indicates the voltage at node 211 between the primary winding 161-1 and the secondary winding 162-1; voltage Vy indicates the voltage at node 212 of the primary winding 161-2 and secondary winding 162-2.

Icres1 represents current through the series combination of capacitor Cres1 and primary winding 161-2; Icres2 represents current though the series combination of capacitor Cres2 and primary winding 161-1.

Izvs represents current through the inductor Lzvs.

Is1 represents current through the secondary winding 162-1; Is2 represents current though the secondary winding 162-2.

Iout (summation of current Is1 and current Is2) represents the output current (Tout) supplied by the center tap of secondary winding 162 of the multi-tapped autotransformer 160 to a dynamic load 118. Between time T0 and time T1, when the resonant circuit path including capacitor Cres1 and primary winding 161-2 are coupled to input voltage via activation of switch Q1, the corresponding generated current Is1 contributes a majority of the current to produce the current Tout. Conversely, between time T2 and time T3, when the resonant circuit path including capacitor Cres 2 and primary winding 161-1 are coupled to input voltage via activation of switch Q2, the corresponding generated current Is2 contributes a majority of the current to produce the current Tout.

Figure 5:
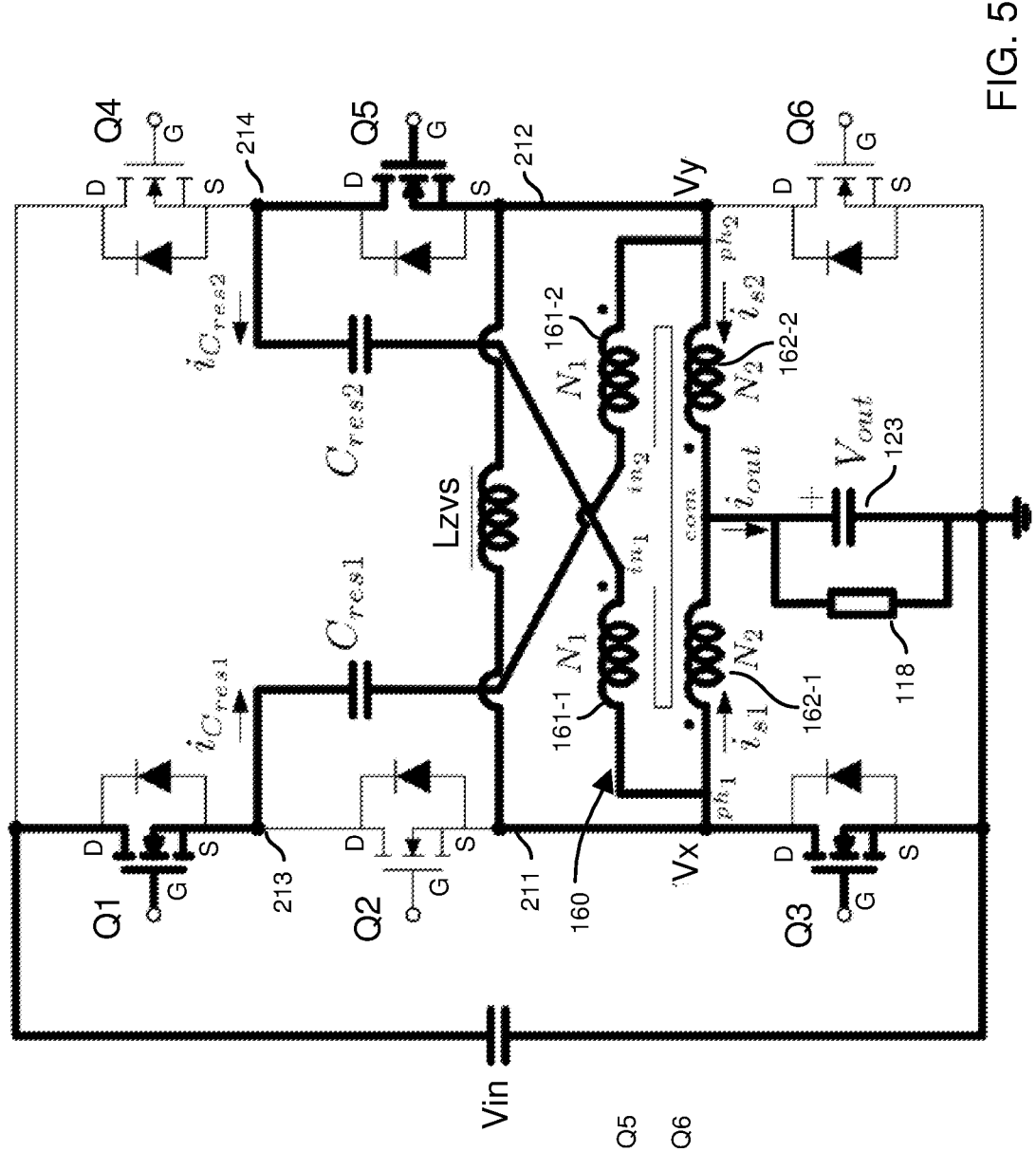
FIG. 5 is an example diagram illustrating a first mode of controlling switches in a switched-capacitor converter according to embodiments herein.

FIG. 5 is an example diagram illustrating a first mode (phase #1) of controlling switches in a switched-capacitor converter and voltage converter according to embodiments herein.

For the phase #1, between time T0 and time T1, switches Q2, Q4, and Q6 are turned OFF; switches Q1, Q3, and Q5 are turned ON in ZVS and in zero current switching (ZCS) and the first resonant mode transition takes place between capacitor Cres1 and the leakage inductance of the multi-tapped autotransformer, whilst the second resonant mode transition takes place between capacitor Cres2 and the leakage inductance of the multi-tapped autotransformer 160.

In such an instance, during phase #1, capacitor Cres1 is soft-charged from the input voltage source Vin while capacitor Cres2 is soft-discharged.

More specifically, as previously discussed, the primary winding 161 of the multi-tapped autotransformer 160 includes a first node 211 and a second node 212. During time T0 to time T1 (a first resonant frequency mode), the controller 140 creates a first switched circuit path connecting the capacitor Cres1 to the input voltage Vin; the controller 140 further creates a second switched circuit path by connecting the capacitor Cres2 to node 212. As previously discussed, in such an instance, the capacitor Cres1 is soft charged via input voltage Vin, the capacitor Cres2 (flying capacitor charged to Vin/2) is soft discharged. Accordingly, during phase #1, to a different degree, both resonant circuit paths contribute to generation of the output voltage 123 that powers the load 118.

When capacitances are substantially equal such as capacitance of Cres1=capacitance of Cres2, the RMS (Root Mean Square) current through each capacitor is approximately the same. If perfect balance is present between the actual resonant current through capacitors Cres1 and Cres2, then i(Cres1) (t)=−i(Cres2) (t), and considering i(Cres1)(t)= Tres (t) it follows that Is2(t)=2*Ires(t). In this scenario, the following equation are valid in phase #1:

$$N1*Tres(t)+N1*Tres(t)=N2*Is1(t)-N2*Is2(t)$$

which can be written as:

$$Is1(t)=[(2*N1)/N2+2]*Tres(t) \text{ as shown in FIG. 4.}$$

In such phase #1, the converter presents in general two resonant modes based on the actual value of Cres1 and Cres2. For example Cres1 is facing a resonant current with resonant switching defined by Fres1=1/(2*pi*sqrt(Cres1*Lk)) where Lk is leakage of the multi-tapped autotransformer.

Whilst Cres2 is facing a resonant current with resonant switching defined by Fres2=1/(2*pi*sqrt(Cres2*Lk)) where Lk is leakage of the multi-tapped autotransformer.

Figure 6:
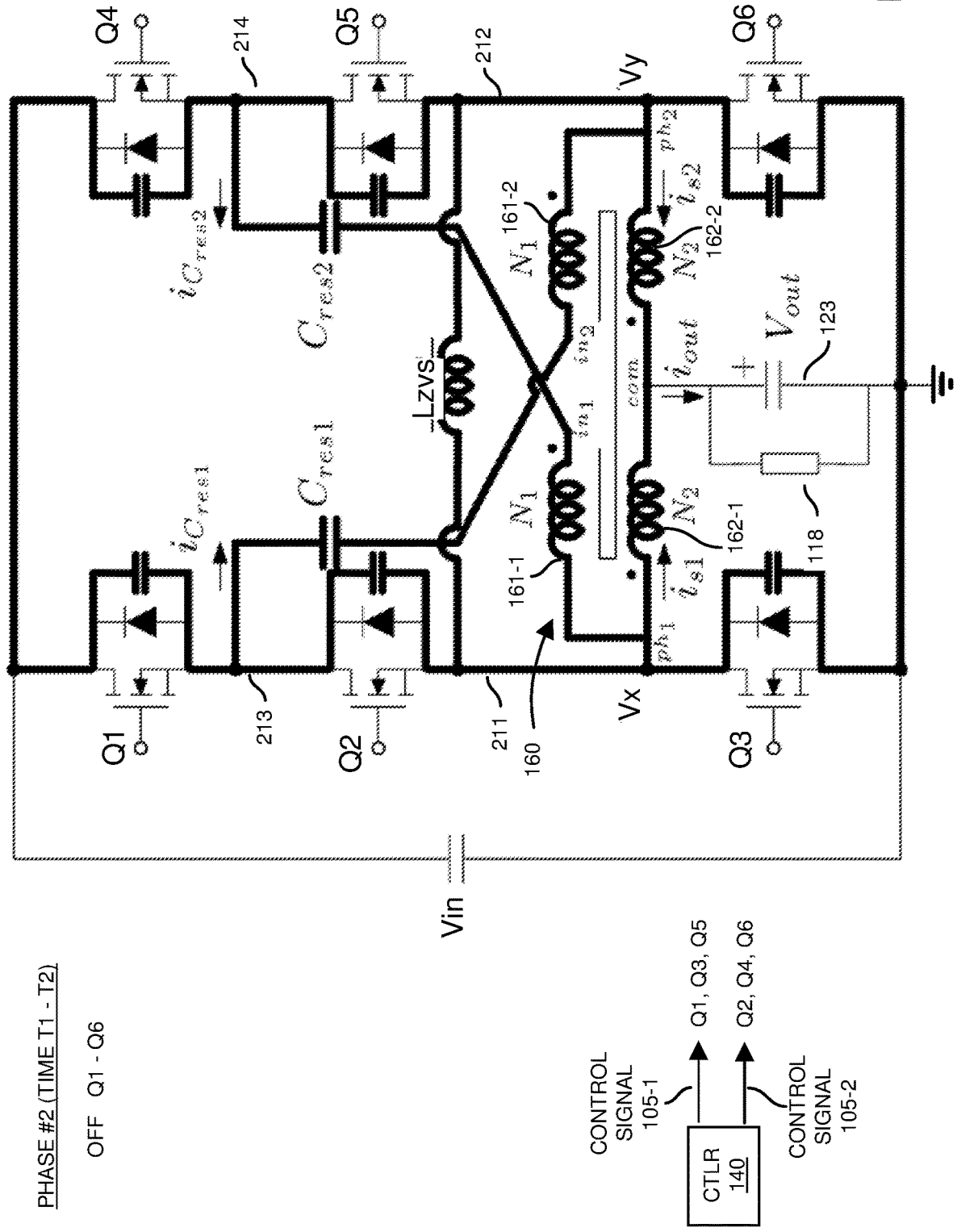
FIG. 6 is an example diagram illustrating a dead time or deactivation of switches in a switched-capacitor converter according to embodiments herein.

FIG. 6 is an example diagram illustrating a dead time or deactivation of all switches in a switched-capacitor converter and voltage converter according to embodiments herein.

Between time T1 and time T2, controller 140 turns OFF switches Q1, Q3 and Q5. The parasitic capacitance of Q1 is charged to Vin/2+Vout*N1/N2; switch Q3 is charged to 2*Vout; switch Q5 is charged at the input voltage Vin, whilst the parasitic capacitance of switches Q2, Q4 and Q6 are discharged to zero, using the inductive energy stored in the inductor Lzvs. When the capacitance of switch Q2, Q4, and Q6 are discharged to zero, their body diodes start to conduct to enable ZVS turn on. The current Izvs(T1) that enables ZVS operation, is denoted as i(Lzvs,pk)) as shown in FIG. 4 which is given by the following equation:

$$I_{L_{zvs,pk}} = \frac{V_{out}}{2*L_{zvs}*f_{sw}}$$

In one embodiment, the value of Lzvs is strongly dependent on the application basically it depends on the input voltage, output voltage, and the MOSFET used in the application.

Figure 7:
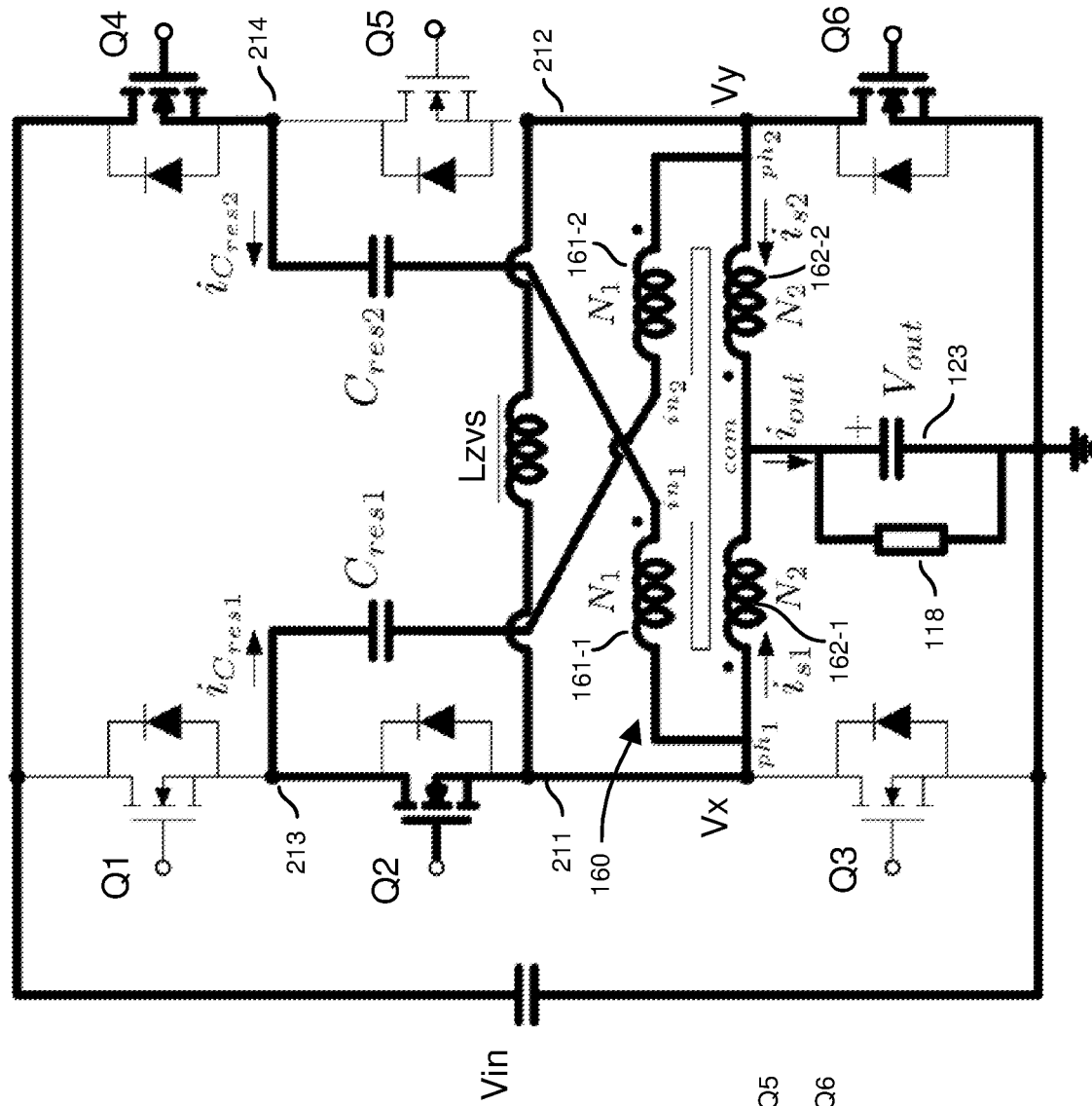
FIG. 7 is an example diagram illustrating a second mode of controlling switches in a switched-capacitor converter according to embodiments herein.

FIG. 7 is an example diagram illustrating a second mode (a.k.a., phase #3) of controlling switches in a switched-capacitor converter and voltage converter according to embodiments herein.

For the phase #3, between time T2 and time T3, at t=T2 witches Q2, Q4 and Q6 are turned ON in ZVS and ZCS; switches Q1, Q3, and Q5 are OFF.; In ZVS and in zero current switching (ZCS) and the first resonant mode transition takes place between capacitor Cres1 and the leakage inductance of the multi-tapped autotransformer, whilst the second resonant mode transition takes place between capacitor Cres2 and the leakage inductance of the multi-tapped autotransformer 160.

In such an instance, during phase #3, capacitor Cres2 is soft-charged from the input voltage source Vin while capacitor Cres1 is soft-discharged.

More specifically, as previously discussed, the primary winding 161 of the multi-tapped autotransformer 160 includes a first node 211 and a second node 212. During time T2 to time T3 (a second resonant frequency mode), the controller 140 creates a first switched circuit path connecting the capacitor Cres2 to the input voltage Vin via switch Q4; the controller 140 further creates a second switched circuit path by connecting the capacitor Cres1 to the node 211. As previously discussed, in such an instance, the capacitor Cres1 (flying capacitor) is soft discharged, the capacitor Cres2 (charged to Vin/2) is soft charged. Accordingly, during phase #3, to a different degree, both resonant circuit paths contribute to generation of the output voltage 123 that powers the load 118.

When capacitances are substantially equal such as capacitance of Cres1=capacitance of Cres2, the RMS (Root Mean Square) current through each capacitor is approximately the same. If perfect balance is present between the actual resonant current through capacitors Cres1 and Cres2, then ICres1(t)=−ICres2(t), and considering ICres1(t)=Ires(t), it follows that Is1(t)=2*Ires(t). In this scenario, the following equation are valid in phase #3:

$$-N1*Tres(t)-N1*Tres(t)=N2*Is1(t)-N2*Is2(t)$$

which can be written as:

$$Is2(t)=[(2*N1)/N2+2]*Tres(t) \text{ as shown in FIG. 4.}$$

This converter includes two separate resonant tank circuits. In such an instance, there are two resonant frequencies based on the actual value of Cres1 and Cres2. For example Cres1 is facing a resonant current with resonant switching defined by Fres1=1/(2*pi*sqrt(Cres1*Lk)) where Lk is leakage of the multi-tapped autotransformer.

Whilst Cres2 is facing a resonant current with resonant switching defined by Fres2=1/(2*pi*sqrt(Cres2*Lk)) where Lk is leakage of the multi-tapped autotransformer.

Figure 8:
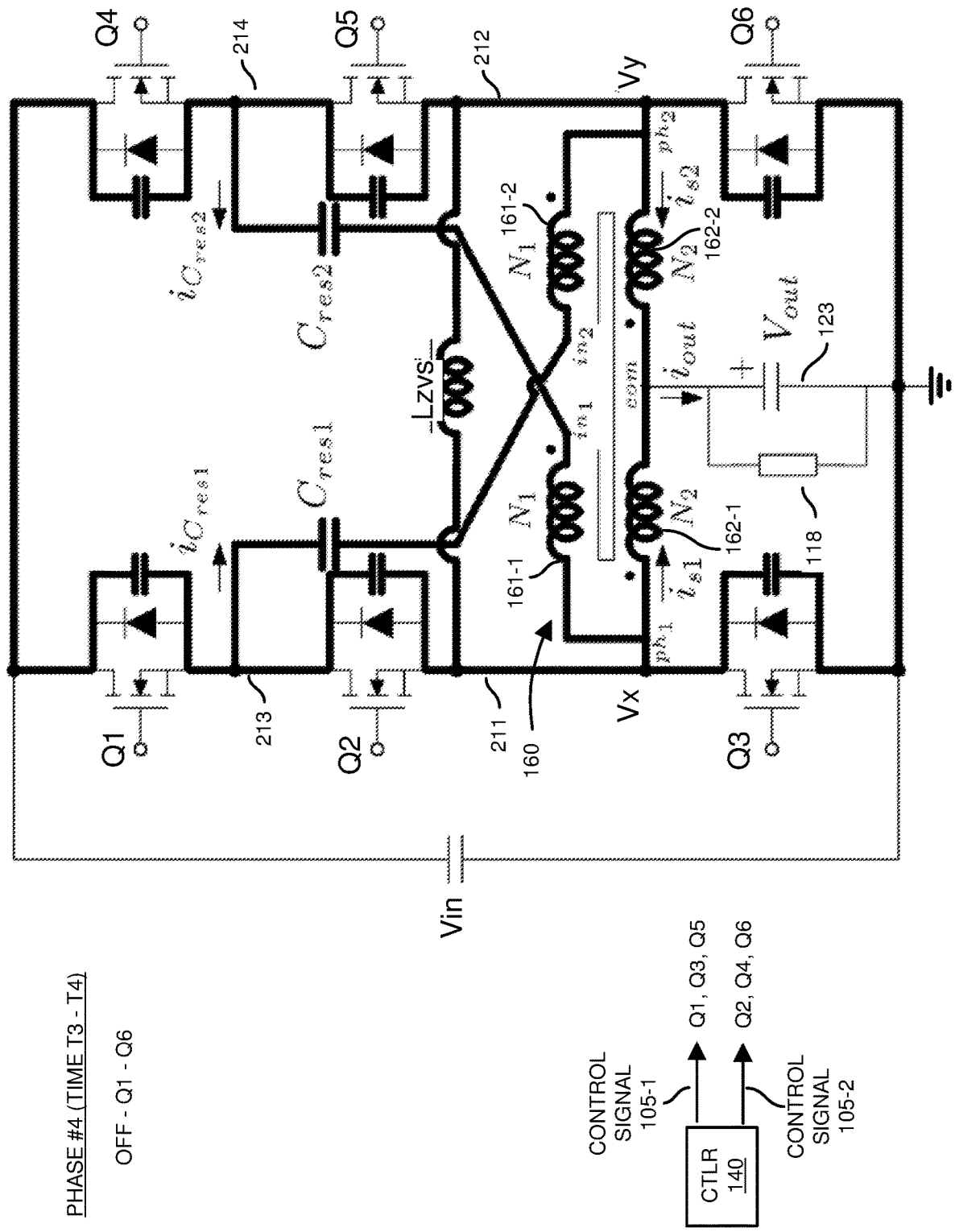
FIG. 8 is an example diagram illustrating a dead time or deactivation of switches in a switched-capacitor converter according to embodiments herein.

FIG. 8 is an example diagram illustrating a dead time or deactivation of all switches in a switched-capacitor converter and voltage converter according to embodiments herein.

Between time T3 and time T4, controller 140 turns OFF switches Q2, Q4, and Q6 and the parasitic capacitance of switch Q4 is charged to Vin/2+Vout*N1/N2, switch Q2 is charged at the input voltage, Vin, switch Q6 is charged to 2*Vout, whilst the parasitic capacitance of switches Q1, Q3, and Q5 are discharged to zero.

When the capacitance of switches Q1, Q3, and Q5 are discharged to zero, their respective body diodes start to conduct to enable ZVS turn on. The current that enables ZVS is Izvs(t3) which correspond with −IL(zvs,pk). Thus, IL(zvs,pk) is a good index to establish when ZVS condition is achieved for all switches.

At t=T4, switches Q1, Q3, and Q5 are turned ON in ZVS and ZCS (Zero Current Switching), concluding the switching period (i.e., time T0 to time T4).

As highlighted in the operation of the power supply 100 in different phases (in FIGS. 5-8), the power supply 100 converter achieves ZVS conditions in all load conditions regardless of the tolerance of the components.

In one embodiment, if the expected ZVS condition is designed for the worst case (Vin=V(in,min) and Lzvs+tolerance(Lzvs)), the converter as described herein can achieve soft switching operation in all load conditions for all input voltages and load conditions, which renders embodiments herein suitable for mass production. Moreover, as previously reported, the multi-tapped autotransformer of the voltage converter 135 as described herein can be implemented with a multi-tapped matrix (a.k.a., MMTA) resulting in lower windings and core losses.

Figure 9:
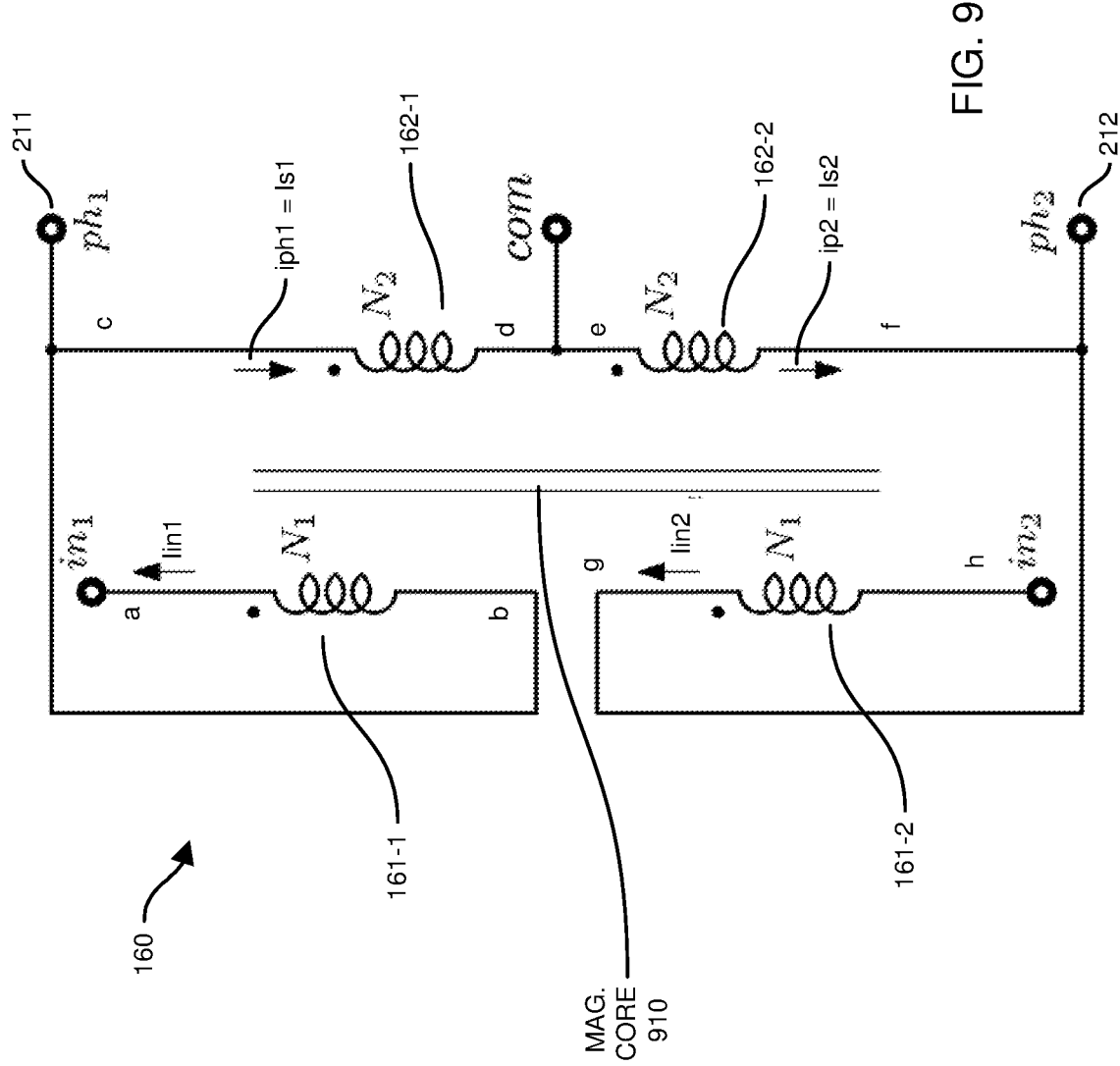
FIG. 9 is an example diagram illustrating details of a multi-tapped autotransformer according to embodiments herein.

FIG. 9 is an example diagram illustrating details of a multi-tapped autotransformer according to embodiments herein.

One benefit of implementing the multi-tapped autotransformer 160 in the voltage converter 135 (FIG. 2) is high efficiency and high power density, enabling use of lower voltage rating MOSFETs (such as for switches Q1-Q6) comparing with a classic LLC converter and enabling the choice of implementing Class II ceramic capacitors (such as for Cres1 and Cres2), which inherently offer high capacitance density.

Moreover, as previously discussed, the additional inductor Lzvs (alternatively implemented via the magnetizing inductance of the multi-tapped autotransformer) provides the inductive energy to ensure ZVS transition for all switches (such as MOSFETs) in the voltage converter 135.

In addition to these benefits, another benefit of the multi-tapped 160 is the inherent lower windings losses in comparison to classic LLC converters; the overall conduction stresses for all FETs (such as switches Q1-Q6) are reduced, providing a higher reliability power.

As shown in FIG. 2 and FIG. 9, one example of a proposed multi-tapped autotransformer 160 comprises: 4 windings. All windings are arranged in series, starting from terminal node in1 (node a) and ending at terminal node in2 (node h). More specifically, a combination of primary winding 161-1 (between node a and node b), secondary winding 162-1 (between node c and node d), secondary winding 162-2 (between node e and node f), and primary winding 161-2 (between node g and node h) are connected in series between node in1 and node in2. Multi-tapped autotransformer 160 includes so-called taps at node in1, tap node ph1, tap node com, tap node ph2, and node in2.

The discussion below provides a further understanding associated with the magnetic structure of an embodiment of the multi-tapped autotransformer 160.

More specifically, in this example embodiment of FIG. 9, the four windings of the multi-tapped autotransformer 161 are wound on or around a common magnetic core 910, forming an multi-tapped autotransformer. As previously discussed, the windings of multi-tapped autotransformer 160 include: i) a first group of windings (any suitable number of windings) formed by the primary windings between node in1 and node ph1 and between node in2 and node ph2; ii) a second group of windings (any suitable number of windings) includes secondary winding 162-1 and secondary winding 162-2 such as between node PH1 and node PH2.

Based on this assumption, and if an ideal multi-tapped autotransformer is considered and considering that the Magneto Motive Force (MMF) is established by Is1 (a.k.a., Iph1) and Is2 (a.k.a., Iph2) at the secondary side, it must be countered by an MMF in the primary side established by Iin1 and Iin2. In this scenario the following equations are always valid:

$$N1*Iin1+N1*Iin2=N2*iph1+N2*iph2$$

Figure 10:
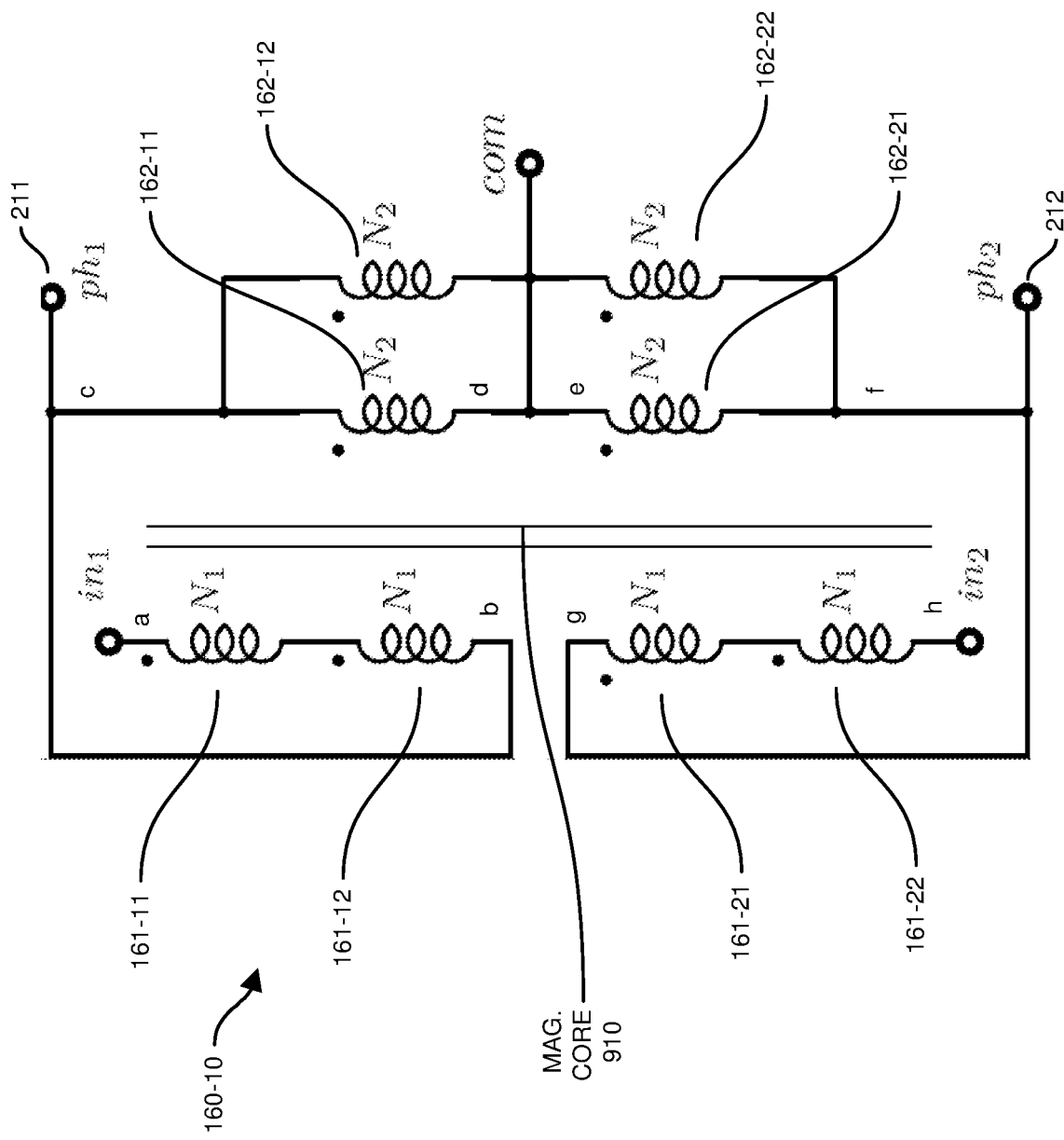
FIG. 10 is an example diagram illustrating details of a multi-tapped matrixautotransformer (with 2 elemental autotransformer) according to embodiments herein.

FIG. 10 is an example diagram illustrating details of a multi-tapped autotransformer according to embodiments herein.

To further increase the performance of the proposed converter 135, the multi-tapped autotransformer 160 in FIG. 2 can be replaced with the enhanced multi-tapped autotransformer 160-10 as shown in FIG. 10.

In this example embodiment of FIG. 10, the multi-tapped autotransformer 160-10 is a multi-tapped matrix autotransformer including two inter-wired elements. Note that the number of inter-wired winding elements can vary depending on the embodiment. For example, the multi-tapped autotransformer 160 as described herein can include any number of primary windings connected in series; the multi-tapped autotransformer 160 can include any number of secondary windings connected in parallel.

In this example embodiment of FIG. 10, the instantiation of the multi-tapped matrix autotransformer 160-10 includes: i) multiple (two) primary windings 161-11 and 161-12 (N1 turns each) connected in series between nodes a and b, ii) multiple secondary windings 162-11 and 162-12 (N2 turns each) connected in parallel between nodes c and d, iii) multiple secondary windings 162-21 and 162-22 (N2 turns each) connected in parallel between nodes e and f, iv) multiple primary winding windings 161-21 and 161-22 (N1 turns each) connected in series between nodes g and h.

As previously discussed, the actual ratio between input and output voltage depends on the ratio between windings N1 and N2 and number of windings in serial or parallel. When the multi-tapped matrix autotransformer (such as multi-tapped autotransformer 160-10 in FIG. 10) is implemented in the power supply 100 of prior figures, the ratio between input voltage Vin and output voltage Vout is given by the following equation:

$$Vin/Vout=4+2*(2N1)/N2$$

Figure 11:
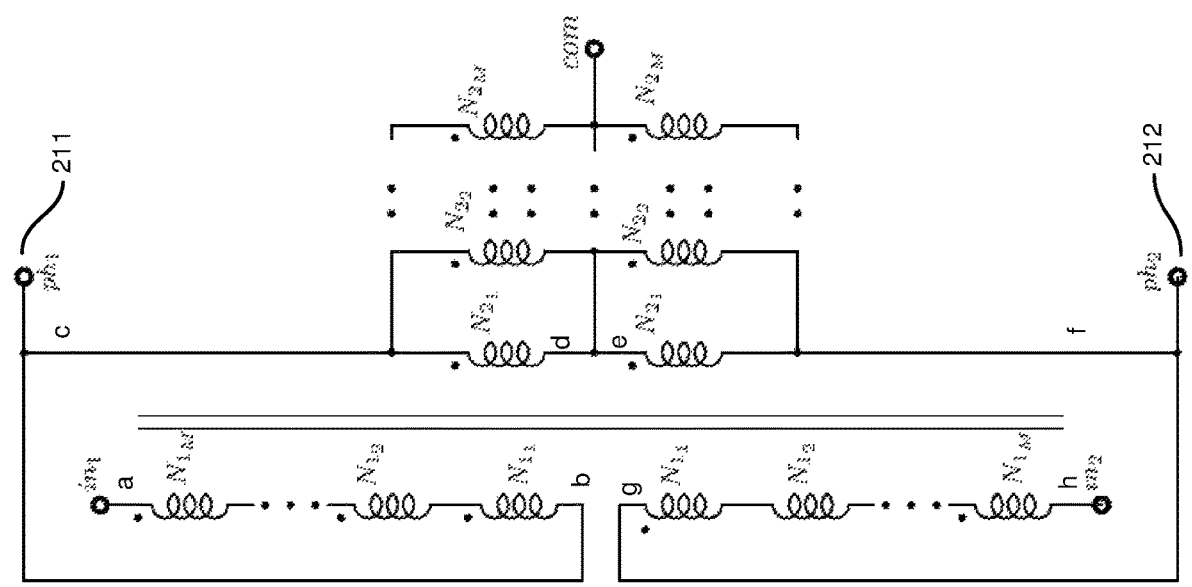
FIG. 11 is an example diagram illustrating details of a (matrix) multi-tapped autotransformer (with M elemental autotransformer) according to embodiments herein.

FIG. 11 is an example diagram illustrating details of a matrix multi-tapped autotransformer according to embodiments herein.

To further increase the performance of the proposed converter 135, the multi-tapped autotransformer 160 can be replaced with the enhanced multi-tapped autotransformer 160-11 as shown in FIG. 11.

As shown in FIG. 11, the number of primary windings and secondary windings in multi-tapped autotransformer 160-11 can vary depending on the embodiment. For example, in the above case of FIG. 10, there are M=2 primary windings and secondary windings.

Note further that the multi-tapped autotransformer 160 as described herein as implemented in power supply 100 can include any number of M (any integer value such as M=2, M=3, M=4, etc.) primary windings (connected in series) and M (any integer value such as M=2, M=3, M=4, etc.) second windings (connected in parallel).

For example, multi-tapped matrix autotransformer 160-11 includes: multiple primary windings N1M=N12= N11= . . . =N1 coupled in series between node a and node b, multiple secondary windings N2M=N21=N22= . . . =N2 coupled in parallel between node c and node d, multiple secondary windings (N21, N22, . . . N2M) coupled in parallel between node e and node f, multiple primary windings (N11, N12, . . . N1M) coupled in series between node g and node h.

In such an instance, the ratio between input voltage Vin and output voltage Vout is given by the following equation:

$$Vin/Vout=4+2(M*N1)/N2$$

where M (such as any integer value 1, 2, 3, 4, 5, 6, etc.) is the number of windings connected in series at the primary side and the number of windings connected in parallel at secondary side.

The benefits of using a multi-tapped autotransformer 160 as described herein, in the proposed topology, is that it can split current between secondary windings connected in parallel reducing the leakage inductance of the secondary loop inductance and reducing the overall windings losses; moreover, if designed properly, this allows for flux cancellation.

In one embodiment, X=Y. Note that multi-tapped autotransformer 160 can be configured to include X primary windings connected in series between nodes a and b; and X primary windings connected in series between nodes g and h. In the same circuit, the transformer 160 can be configured to include X secondary windings connected in parallel between nodes c and d; and X second windings connected in parallel between nodes e and f.

Figure 12:
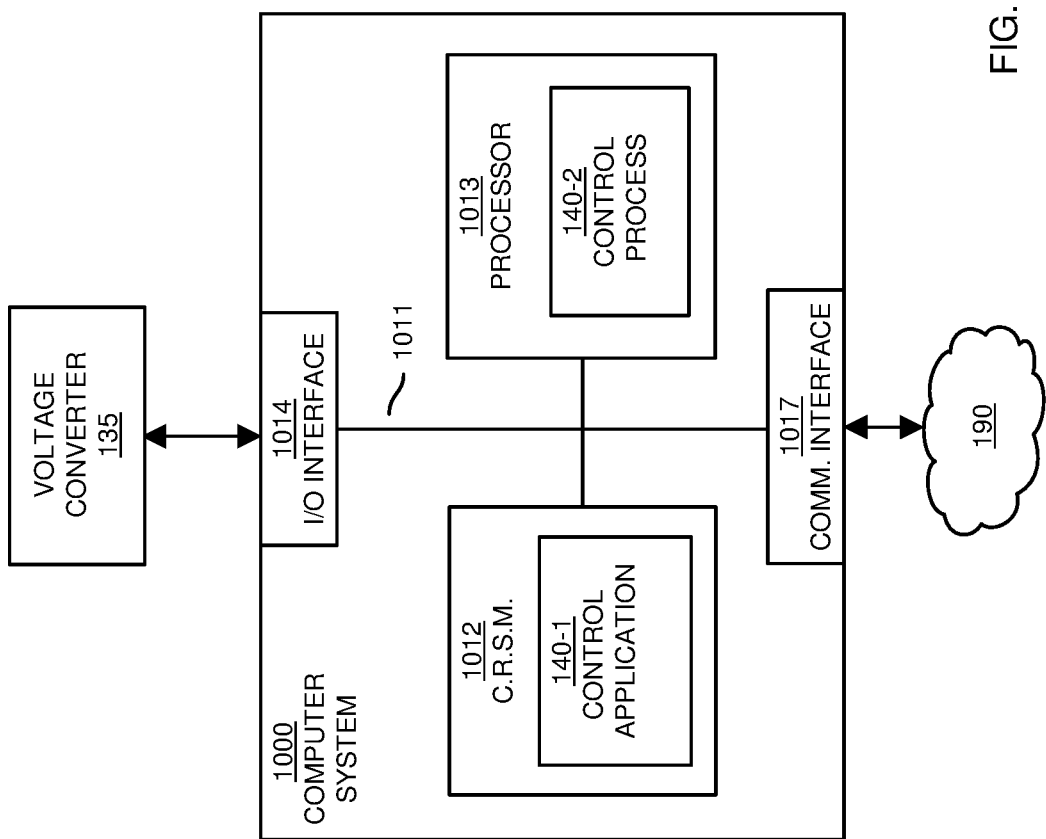
FIG. 12 is an example diagram illustrating computer architecture operable to execute one or more operations according to embodiments herein.

FIG. 12 is an example block diagram of a computer system for implementing any of the operations as previously discussed according to embodiments herein.

Any of the resources (such as controller 140, voltage converter 135, switched-capacitor converter 131, etc.) as discussed herein can be configured to include computer processor hardware and/or corresponding executable instructions to carry out the different operations as discussed herein.

As shown, computer system 1050 of the present example includes an interconnect 1011 that provides coupling of computer readable storage media 1012 such as a non-transitory type of media (which can be any suitable type of hardware storage medium in which digital information can be stored and retrieved), a processor 1013 (computer processor hardware), I/O interface 1014, and a communications interface 1017.

I/O interface(s) 1014 supports connectivity to repository 1080 and input resource 1092.

Computer readable storage medium 1012 can be any hardware storage device such as memory, optical storage, hard drive, floppy disk, etc. In one embodiment, the computer readable storage medium 1012 stores instructions and/or data.

As shown, computer readable storage media 1012 can be encoded with controller application 140-1 (e.g., including instructions) to carry out any of the operations as discussed herein.

During operation of one embodiment, processor 1013 accesses computer readable storage media 1012 via the use of interconnect 1011 in order to launch, run, execute, interpret or otherwise perform the instructions in controller application 140-1 stored on computer readable storage medium 1012. Execution of the controller application 140-1 produces controller process 140-2 to carry out any of the operations and/or processes as discussed herein.

Those skilled in the art will understand that the computer system 1050 can include other processes and/or software and hardware components, such as an operating system that controls allocation and use of hardware resources to execute controller application 140-1.

In accordance with different embodiments, note that computer system may reside in any of various types of devices, including, but not limited to, a power supply, switched-capacitor converter, power converter, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1050 may reside at any location or can be included in any suitable resource in any network environment to implement functionality as discussed herein.

Functionality supported by the different resources will now be discussed via flowchart in FIG. 13. Note that the steps in the flowcharts below can be executed in any suitable order.

Figure 13:
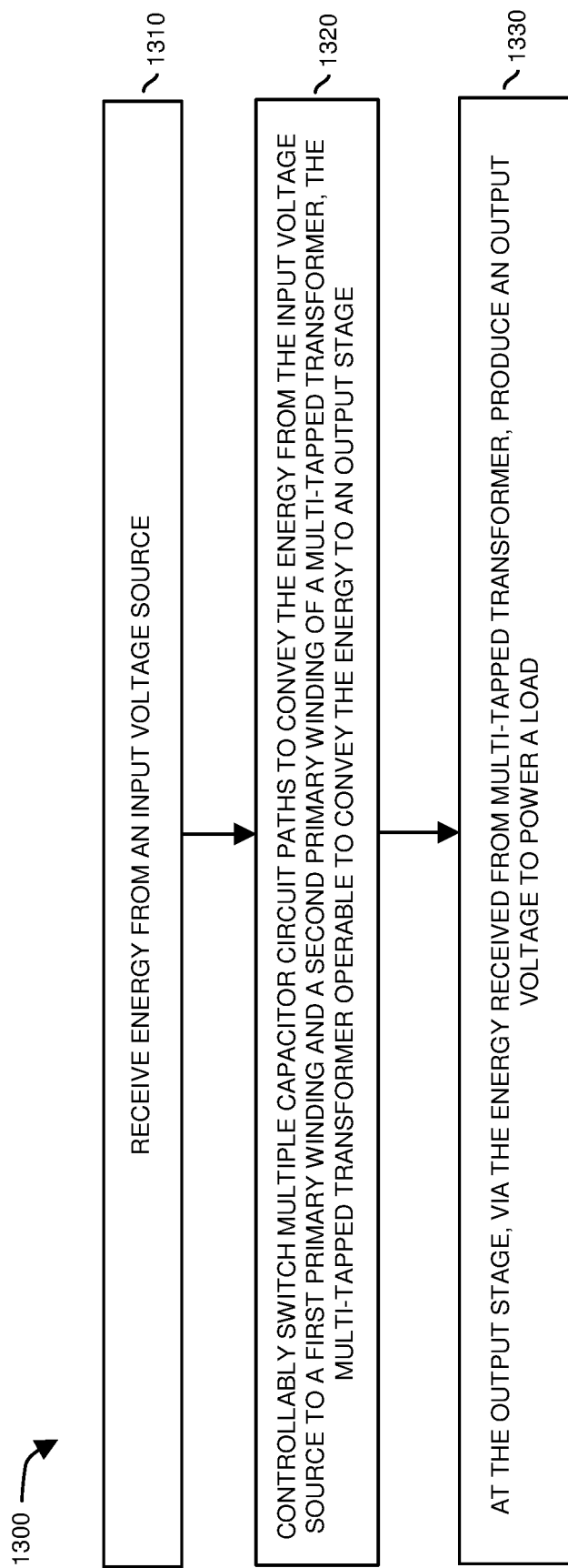
FIG. 13 is an example diagram illustrating a general method according to embodiments herein.

FIG. 13 is a flowchart 1300 illustrating an example method according to embodiments herein. Note that there will be some overlap with respect to concepts as discussed above.

In processing operation 1310, the voltage converter 135 receives energy from an input voltage source, Vin.

In processing operation 1320, the controller 140 controllably switches multiple capacitor circuit paths to convey the energy from the input voltage source, Vin, to a first primary winding 161-1 and a second primary winding 161-2 of the multi-tapped autotransformer 160. As previously discussed, the multi-tapped autotransformer 160 conveys the energy to a secondary winding of the multi-tapped autotransformer in the secondary stage 102 (output stage) of the voltage converter 135.

In processing operation 1330, via the energy received from the multi-tapped autotransformer 160, the secondary stage 102 of the voltage converter produces an output voltage 123 to power the load 118.

Note again that techniques herein are well suited for use in power supply applications. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:
a switched-capacitor converter including multiple capacitors;
a multi-tapped autotransformer including a first primary winding and a second primary winding, the multiple capacitors of the switched-capacitor converter controllably switched in circuit paths including the first primary winding and the second primary winding;
an output stage coupled to receive energy from a combination of the first primary winding and the second primary winding of the multi-tapped autotransformer, the output stage operable to produce an output voltage to power a load; and
wherein the first primary winding, the second primary winding, and a secondary winding of the multi-tapped autotransformer are connected in series.

2. The apparatus as in claim 1, wherein the first primary winding, the second primary winding, and the secondary winding of the multi-tapped autotransformer are magnetically coupled to each other.

3. The apparatus as in claim 2, wherein the secondary winding is center tapped, an output of which produces the output voltage in the output stage.

4. An apparatus comprising:
a switched-capacitor converter including multiple capacitors;
a transformer including a first primary winding and a second primary winding, the multiple capacitors of the switched-capacitor converter controllably switched in circuit paths including the first primary winding and the second primary winding;

an output stage coupled to receive energy from a combination of the first primary winding and the second primary winding of the transformer, the output stage operable to produce an output voltage to power a load; and wherein the first primary winding and the second primary winding are connected in series through a secondary winding of the transformer.

5. The apparatus as in claim 4 further comprising:
an inductor connected in parallel with the secondary winding of the autotransformer.

6. The apparatus as in claim 4, wherein the secondary winding is center tapped, an output of which produces the output voltage.

7. The apparatus as in claim 5, wherein the switched-capacitor converter includes multiple switches; and
wherein the inductor is operative to provide zero voltage switching of the multiple switches in the switched-capacitor converter.

8. The apparatus as in claim 1, wherein the multiple capacitors of the switched-capacitor converter include a first capacitor and a second capacitor;
the apparatus further comprising:
a first resonant circuit path including a combination of the first capacitor and the first primary winding; and
a second resonant circuit path including a combination of the second capacitor and the second primary winding.

9. The apparatus as in claim 8 further comprising:
a controller operable to switch between: i) coupling the first resonant circuit path to an input voltage, and ii) coupling the second resonant circuit path to the input voltage.

10. The apparatus as in claim 1, wherein the switched-capacitor converter includes a first flying capacitor and a second flying capacitor, the first flying capacitor coupled in series with the first primary winding, the second flying capacitor coupled in series with the second primary winding.

11. The apparatus as in claim 1, wherein the switched-capacitor converter includes multiple switches operable to convey energy from a voltage source to each of the first primary winding and the second primary winding.

12. The apparatus as in claim 1, wherein the switched-capacitor converter includes multiple resonant circuit paths operable to convey energy from an input voltage source to the first primary winding and the second primary winding.

13. A method comprising:
receiving energy from an input voltage source;
controllably switching multiple capacitor circuit paths to convey the energy from the input voltage source to a first primary winding and a second primary winding of a multi-tapped autotransformer, the multi-tapped autotransformer operable to convey the energy to an output stage;
at the output stage, via the energy received from the multi-tapped autotransformer, producing an output voltage to power a load; and
wherein the first primary winding, the second primary winding, and a secondary winding of the multi-tapped autotransformer are connected in series.

14. The method as in claim 13, wherein controllably switching multiple capacitor circuit paths includes rectifying an output of the multi-tapped autotransformer to produce the output voltage.

15. The method as in claim 13, wherein the multi-tapped autotransformer includes a center tapped secondary winding, the center-tapped secondary winding producing the output voltage.

16. The method as in claim 13 further comprising: via an inductor, providing zero voltage switching of the multiple switches in the switched-capacitor converter.

17. The method as in claim 13, wherein the multiple capacitor circuit paths include: i) a first resonant circuit path including a combination of a first capacitor and the first primary winding, and ii) a second resonant circuit path including a combination of the second capacitor and the second primary winding; and
wherein controllably switching multiple capacitor circuit paths includes: switching between: i) coupling the first resonant circuit path to an input voltage, and ii) coupling the second resonant circuit path to the input voltage.

18. The method as in claim 13, wherein producing the output voltage to power the load includes: converting an output from the secondary winding of the multi-tapped autotransformer into the output voltage.

19. Computer-readable storage hardware having instructions stored thereon, the instructions, when carried out by computer processor hardware, cause the computer processor hardware to:
controllably switch multiple capacitor circuit paths to convey the energy from an input voltage source to a first primary winding and a second primary winding of a multi-tapped autotransformer, wherein the first primary winding, the second primary winding, and a secondary winding of the multi-tapped autotransformer are connected in series, the multi-tapped autotransformer operable to convey the energy to an output stage of a voltage converter; and
at the output stage, via the energy received from the multi-tapped autotransformer, producing an output voltage to power a load.

20. The apparatus as in claim 1, wherein the output stage includes the secondary winding magnetically coupled to the first primary winding and the second primary winding, the secondary winding operable to produce the output voltage.

21. The apparatus as in claim 20, wherein the secondary winding is disposed in series between the first primary winding and the second primary winding.

22. An apparatus comprising:
a switched-capacitor converter including multiple capacitors;
a multi-tapped autotransformer including a first primary winding and a second primary winding, the multiple capacitors of the switched-capacitor converter controllably switched in circuit paths including the first primary winding and the second primary winding; and
an output stage coupled to receive energy from a combination of the first primary winding and the second primary winding of the multi-tapped autotransformer, the output stage operable to produce an output voltage to power a load;
wherein the output stage includes a secondary winding magnetically coupled to the first primary winding and the second primary winding, the secondary winding operable to produce the output voltage;
wherein the multiple capacitors include a first capacitor and a second capacitor, the apparatus further comprising:
a first switch, the first switch operable to selectively couple a first node of the first capacitor to a first transformer node connecting the first primary winding and the secondary winding, a second node of the first capacitor coupled to the second primary winding; and a second switch, the second switch operable to selectively couple a first node of the second capacitor to a second transformer node connecting the second primary winding and the secondary winding, a second node of the second capacitor coupled to the first primary winding; and a controller operable to control activation of the first switch and the second switch at different times.

23. The apparatus as in claim 1 further comprising:
a first switch coupled to a first node of the first primary winding;
a second switch coupled to a first node of the second primary winding; and
a controller operable to control activation of the first switch and the second switch at different times, activation of the first switch coupling the node of the first primary winding to a reference voltage, activation of the second switch coupling the node of the second primary winding to the reference voltage.

24. The apparatus as in claim 23, wherein the multiple capacitors include a first capacitor and a second capacitor, the first capacitor coupled to a second node of the first primary winding, the second capacitor coupled to a second node of the second primary winding;
wherein a combination of the first capacitor and the first primary winding is a first resonant circuit path; and
wherein a combination of the second capacitor and the second primary winding is a second resonant circuit path.

25. The apparatus as in claim 24 further comprising:
a third switch coupled to the first capacitor;
a fourth switch coupled to the second capacitor; and
a controller operable to control activation of the third switch and the fourth switch at different times, activation of the third switch coupling the first capacitor to an input voltage being converted into the output voltage, activation of the fourth switch coupling the second capacitor to the input voltage.

26. The apparatus as in claim 4, wherein the transformer is a multi-tapped autotransformer.

* * * * *